United States Patent [19]
Inaba et al.

[11] Patent Number: 5,922,454
[45] Date of Patent: Jul. 13, 1999

[54] MAGNETIC RECORDING MEDIUM

[75] Inventors: Hiroo Inaba; Masaki Suzuki; Satoshi Matsubagichi; Hiroaki Takano, all of Kanagawa, Japan

[73] Assignee: Fuji Photo Film Co., Ltd., Kanagawa, Japan

[21] Appl. No.: 08/862,262

[22] Filed: May 23, 1997

Related U.S. Application Data

[63] Continuation-in-part of application No. 08/614,012, Mar. 12, 1996, abandoned.

[30] Foreign Application Priority Data

Mar. 17, 1995 [JP] Japan ................................ 7-84505

[51] Int. Cl.$^6$ ................................................ G11B 5/706
[52] U.S. Cl. ........................ 428/328; 428/329; 428/330; 428/336; 428/694 BA; 428/694 BS; 428/694 BN
[58] Field of Search ..................... 428/328, 329, 428/330, 336, 694 BA, 694 BS, 694 BN, 900

[56] References Cited

U.S. PATENT DOCUMENTS

| | | | |
|---|---|---|---|
| 5,405,679 | 4/1995 | Isobe | 428/212 |
| 5,458,948 | 10/1995 | Yanagita et al. | 428/141 |
| 5,496,622 | 3/1996 | Isobe et al. | 428/216 |
| 5,527,603 | 6/1996 | Isobe et al. | 428/323 |
| 5,580,399 | 12/1996 | Tamai et al. | 148/301 |
| 5,591,535 | 1/1997 | Hisano et al. | 428/694 RE |
| 5,612,122 | 3/1997 | Tsukamoto et al. | 428/216 |
| 5,700,563 | 12/1997 | Goto et al. | 428/328 |
| 5,712,028 | 1/1998 | Seki et al. | 428/216 |

*Primary Examiner*—Stevan A. Resan
*Attorney, Agent, or Firm*—Sughrue, Mion, Zinn, Macpeak & Seas, PLLC

[57] ABSTRACT

A magnetic recording medium is disclosed, comprising a lower coating layer mainly comprising an inorganic powder and a binder provided on a non-magnetic support, and one or more magnetic layers comprising at least a ferromagnetic metal powder and a binder provided on the lower coating layer, wherein the thickness of said magnetic layers is from 0.05 $\mu$m to 0.8 $\mu$m and the magnetic particle incorporated in said magnetic layers comprises Fe as a main component, Co in an amount of from 10 atm-% to 40 atm-% and Y is an amount of from 1.5 atm-% to 10 atm-%, based on Fe.

23 Claims, No Drawings

MAGNETIC RECORDING MEDIUM

This is a Continuation-in-Part Application of application Ser. No. 08/614,012 filed Mar. 12, 1996 now abandoned.

FIELD OF THE INVENTION

The present invention relates to a magnetic recording medium, particularly a magnetic recording medium adapted for the recording/reproduction of digital signal at a high density. More particularly, the present invention relates to a coating type magnetic recording medium which exhibits excellent output and CNR at high frequencies and a good compatibility with vapor deposition type magnetic tapes and gives little head abrasion.

BACKGROUND OF THE INVENTION

Magnetic recording media are widely used for recording tape, video tape, computer tape, disc, etc. The recording density of magnetic recording media have become higher and higher, and their recordable wavelength has become shorter and shorter every year. As the recording system for such the magnetic recording media there have been studied analog system as well as digital system. In order to meet the demand for higher density, a magnetic recording medium comprising a metal thin film as a magnetic layer has been studied. However, a so-called coating type magnetic recording medium comprising a dispersion of a ferromagnetic powder in a binder coated on a support is excellent from the standpoint of practical reliability such as productivity and corrosion resistance. As such the coating type magnetic recording medium there has been widely used a magnetic recording medium comprising a magnetic layer containing a ferromagnetic iron oxide, Co-modified ferromagnetic iron oxide, $CrO_2$, ferromagnetic alloy powder or the like dispersed in a binder coated on a non-magnetic support. However, the coating type magnetic recording medium has a low packing density of magnetic particle and thereby has poor electromagnetic characteristics as compared with the metal thin film type magnetic recording medium.

The enhancement of the electromagnetic characteristics of the coating type magnetic recording medium may be accomplished, e.g., by the improvement of the magnetic properties of the ferromagnetic powder, the smoothening of the surface thereof, etc. Various approaches have been proposed but leave something to be desired for the demand for higher density. The recent trend is for shorter recording wavelength with higher density. This occurs problems of self demagnetization loss during recording or thickness loss during reproduction causing output drop if the magnetic layer is too thick. Thus, an extremely thin film coating type magnetic recording medium has been proposed. In recent years, a so-called ME (metal-evaporated) tape on which a thin metal has been vacuum-evaporated has been put into practical use in the field of Hi-8 and digital VCR for consumers' use. Thus, a system which employs both an alloy powder tape, i.e., so-called MP (metal particulate) and the ME tape has been put into practical use.

In particular, the ME tape which outperforms Hi-8 ME tape is designed as a subreference in the field of DVC, where the format was specified in 1994. The ME tape differs from the conventional Hi-8 ME tape in the composition of magnetic particle. In other words, this ME tape comprises a Co system instead of Co-Ni alloy. Further, this ME tape has a DLC (diamond like carbon) film to protect the metal thin film.

In order to cooperate with ME tape in a DVC system, the MP tapes must have a thinner magnetic layer to attain a higher output similarly to the ME tape. Since the ME tape has a DLC film to protect the hard metal film and the surface layer, it gives a head contact different from that of the MP tape. Further, since the ME tape for DVC gives very little head abrasion as compared with the conventional Hi8 ME tape, the magnetic head is designed to have a smaller effective thickness at the tip thereof in DVC system than in the conventional system.

Heretofore, the MP tape has normally-comprised an abrasive agent having a high Mohs' hardness incorporated in a magnetic layer to minimize the clogging or output drop. However, if such the abrasive agent is incorporated in too large an amount, it presents a problem of aggravation of head abrasion. On the contrary, if such an abrasive agent is incorporated in a reduced amount to reduce head abrasion, clogging or output drop can easily occur.

The applicants have heretofore proposed extremely thin film magnetic recording media comprising a lower non-magnetic layer and a thin upper magnetic layer provided thereon.

For example, the following inventions have been proposed.

JP-B-6-93297 (The term "JP-B" as used herein means an "examined Japanese patent publication") discloses a medium comprising a dispersion of a ferromagnetic powder having an average major axis length of less than 0.3 µm and a crystallite size of less than 300 Å coated on a non-magnetic layer. However, the present invention cannot always provide a less head abrasion than the ME tape and be compatible with the ME tape in head contact.

JP-A-5-298653 (The term "JP-A" as used herein means an "unexamined published Japanese patent application") discloses that a medium having a good overwrite characteristics (capability of being overwritten by 7.6 MHz signal on 1.9 MHz signal) and a less strain during digital recording can be obtained by predetermining the thickness of the magnetic layer to less than 0.3 µm and defining the standard deviation of the thickness of the magnetic layer in a predetermined range. However, no reference is made to the compatibility with the ME tape in head-contact and the head abrasion.

JP-A-5-73883 discloses that an MP tape having performance comparable to that of ME tape, i.e., which exhibits reduced self demagnetization loss at a short wavelength range and attains high output over a range from a low frequency to a high frequency without any space loss due to smooth magnetic layer can be obtained by defining the thickness of the magnetic layer to not more than 1 µm and controlling the variation of the thickness of the magnetic layer. This patent claims that a magnetic recording medium which exhibits a good head contact, excellent storage stability and running durability and less dropout, block error rate and is less liable to edge damage can be provided. However, no reference is made to the improvement in the compatibility with a high performance ME tape comprising a DLC film in head contact.

JP-A-5-28464 discloses a magnetic recording medium comprising a non-magnetic layer composed of only a binder and a semisolid or liquid additive and a magnetic layer having a thickness of not more than 1 µm. This patent claims that the magnetic recording medium can be prevented from having surface roughness to provide improvements in waveform responce, overwritability (capability of being overwritten by 20 MHz signal on 10 MHz signal) and 40 MHz output. However, no reference is made to the compatibility with ME tape in head contact and the head abrasion.

U.S. Pat. No. 5,527,603 discloses that the definition of the proportion of Al and rare earth elements to Fe in a metallic magnetic material provides improvements in electromagnetic characteristics and running durability. Although this patent discloses Co content and the use of Y as a rare earth element, no reference is made to their relationship with the compatibility with ME tape in head contact or the head abrasion. Thus, the objects of the present invention cannot be accomplished by this patent.

SUMMARY OF THE INVENTION

The object of the present invention is to provide a magnetic recording medium having good electromagnetic characteristics. In particular, an object of the present invention is to provide a medium which exhibits a good compatibility with ME tape in head contact, causes neither output drop nor clogging, and gives little head abrasion.

We studied a magnetic recording medium which has a reduced head abrasion and exhibits electromagnetic characteristics on the same or higher level than that of ME tape while being kept compatible with a high performance ME tape comprising a DLC film in head contact. As a result, it was found that the foregoing object can be accomplished by satisfying the following requirements. In other words, the present invention provides a magnetic recording medium comprising a lower coating layer mainly comprising an inorganic powder and a binder provided on a non-magnetic support, and one or more magnetic layers comprising at least a ferromagnetic metal powder and a binder provided on the lower coating layer, wherein the total thickness of said magnetic layers is from 0.05 $\mu$m to 0.8 $\mu$m and the magnetic particle incorporated in said magnetic layers comprises Fe as a main component, Co in an amount of from 10 atm-% to 40 atm-% and Y in an amount of from 1.5 atm-% to 10 atm-%, based on Fe. Preferred embodiments of the present invention will be given below.

(1) The magnetic particle incorporated in the magnetic layers comprises Fe as a main component, Co in an amount of from 10 to 40 atom-% (preferably from 15 to 35 atom-%) and Y in an amount of from 1.5 to 10 atom-% (preferably from 2 to 8 atom-%), based on Fe.

(2) The total thickness of the magnetic layers is from 0.05 to 0.8 $\mu$m (preferably from 0.1 to 0.5 $\mu$m).

(3) The magnetic particle incorporated in the magnetic layer comprises Al in an amount of from 0 to 12 atom-% (preferably 2 to 10 atom-%) based on Fe, the atomic proportion of Y to Fe is greater than that of Al to Fe.

(4) The inorganic powder to be incorporated in the foregoing lower coating layer mainly comprises a granular non-magnetic metal oxide having a grain diameter of not more than 0.08 $\mu$m.

(5) The inorganic powder to be incorporated in the foregoing lower coating layer mainly comprises an acicular non-magnetic metal oxide having a major axis length of not more than 0.3 $\mu$m and an aspect ratio of from 2 to 20.

(6) As the magnetic particle to be incorporated in the foregoing upper magnetic layer, a magnetic metal powder having Hc of from 1,800 Oe to 3,500 Oe and $\sigma$S of from 125 emu/g to 180 emu/g. The magnetic particle preferably is substantially free of Ni.

(7) The foregoing magnetic metal particle has a major axis length of from 0.04 $\mu$m to 0.18 $\mu$m, a crystallite size of from 100 Å to 350 Å and an acicular ratio of from 3 to 10.

(8) The amount of the binder to be incorporated in the foregoing upper magnetic layer is preferably from 8% by weight to 24% by weight, more preferably from 9% by weight to 22% by weight, most preferably from 10% by weight to 15% by weight, based on the weight of the magnetic particle.

(9) The content of the non-magnetic powder to be incorporated in the foregoing magnetic layer is from 2% by weight to 15% by weight.

(10) The dispersion of upper magnetic layer is free of polyisocyanate while the dispersion of lower non-magnetic layer contains a polyisocyanate.

(11) The content of the non-magnetic powder having a Mohs' hardness of not less than 6 to be incorporated in the foregoing magnetic layer is preferably from 2 parts by weight to 15 parts by weight, more preferably from 2.2 parts by weight to 10 parts by weight, most preferably from 2.5 parts by weight to 7.5 parts by weight, based on 100 parts by weight of the magnetic particle.

(12) The non-magnetic powder having a Mohs' hardness of not less than 6 to be incorporated in the foregoing magnetic layer has an average grain diameter of from 0.05 $\mu$m to 0.4 $\mu$m.

(13) The amount of Co to be incorporated in the foregoing magnetic metal particle is preferably from 10 atm-% to 40 atm-%, more preferably from 20 atm-% to 40 atm-%, most preferably from 20 atm-% to 35 atm-%, based on Fe.

(14) The amount of Mg to be incorporated in the foregoing magnetic metal material is from 0.1 atm-% to 5 atm-%.

(15) The lower coating layer and at least the magnetic layer adjacent thereto are formed by a wet-on-wet coating method.

In the preferred embodiment of the invention, the magnetic recording medium has a single magnetic layer on the non-magnetic lower coating layer.

Effect

In other words, the present invention is worked out by the following mechanism.

The ferromagnetic metal powder which has heretofore been used contains Co in an amount of 5 atm-% at most. Such the ferromagnetic metal powder couldn't provide a good compatibility with a high performance ME tape in head contact. We thought that the dispersion of a magnetic particle composed of a Fe/Co alloy comprising Fe as a main component but having an increased content of Co in a binder makes a good fitness to a magnetic head similarly to a high performance ME tape comprising Co as a main component, after the example of a high performance ME tape having a magnetic layer mainly composed of Co. The results, described in examples, were that the definition of the thickness of the magnetic layer to a range from 0.05 to 0.8 $\mu$m, which is about on the level of ME tape, provides a very good head contact. As a sintering inhibitor there has heretofore been used a material containing Al. For the rise in the content of Co, a material containing Y may be employed as a sintering inhibitor. The use of such a sintering inhibitor in a predetermined amount makes it possible to obtain an Fe/Co alloy having a larger Co content than the prior art and a uniform grain size. Since the incorporation of Co and Y in the magnetic particle provides a good fitness to the magnetic head and a smooth sliding movement with the magnetic head as mentioned above, it can be presumed that the-head abrasion is minimized.

The lower coating layer will be further described hereinafter.

The inorganic powder to be contained in the lower coating layer of the present invention can be magnetic or non-magnetic, but a non-magnetic powder is preferred. The non-magnetic powder can be selected from the group consisting of inorganic compounds such as metal oxide, metal carbonate, metal sulfate, metal nitride, metal carbide and metal sulfide. Examples of such the inorganic compound include α-alumina having an α-conversion of 90% or more, β-alumina, γ-alumina, θ-alumina, silicon carbide, chromium oxide, cerium oxide, α-iron oxide, goethite, corundum, silicon nitride, titanium carbide, titanium oxide, silicon dioxide, tin oxide, magnesium oxide, tungsten oxide, zirconium oxide, boron nitride, zinc oxide, calcium carbide, calcium sulfate, barium sulfate and molybdenum disulfate, and singly or in combination thereof. Preferred among these inorganic compounds include titanium oxide, zinc oxide, α-iron oxide, barium sulfate and alumina ($Al_2O_3$) because of good availability, low cost, narrow gain size distribution and ease of provision of their functions. Particularly preferred powder among these inorganic compounds is titanium dioxide or α-iron oxide. The average grain diameter of such the non-magnetic powder is preferably in the range of 0.005 to 2 μm. If necessary, non-magnetic powders having different average grain diameters may be used in combination. Alternatively, a single non-magnetic powder having a wide distribution of grain diameter may be used to exert the same effects. In a particularly preferred embodiment, the average grain diameter of non-magnetic powder is preferably in the range of from 0.01 to 0.2 μm. The tap density (measured under the condition of number of tapping: 150 and head: 30 mm) of the non-magnetic powder is preferably in the range of from 0.05 to 2 ml, more preferably from 0.2 to 1.5 g/ml. The water content of the non-magnetic powder is preferably in the range of from 0.1 to 5% by weight, more preferably from 0.2 to 3% by weight, most preferably from 0.3 to 1.5% by weight. The pH value of the non-magnetic powder is preferably in the range of from 2 to 11, particularly preferably from 5 to 10. The specific surface area of the non-magnetic powder is preferably in the range of from 1 to 100 $m^2/g$, more preferably from 5 to 70 $m^2/g$, most preferably from 10 to 65 $m^2/g$. The crystallite size of the non-magnetic powder is preferably in the range of from 0.004 to 1 μm, more preferably from 0.04 to 0.1 μm. The oil absorption of the non-magnetic powder is preferably in the range of from 5 to 100 ml/100 g, more preferably from 10 to 80 ml/100 g, most preferably from 20 to 60 ml/100 g as determined with DBP. The specific gravity of the non-magnetic powder is preferably in the range of from 1 to 12, more preferably from 3 to 6. The shape of the non-magnetic powder may be any of acicular, spherical, polyhedral and tabular forms.

The ignition loss of the non-magnetic powder is preferably not more than 20% by weight and most preferably 0% by weight. The Mohs' hardness of the foregoing inorganic powder which can be used in the present invention is preferably in the range of from 4 to 10. The roughness factor of the surface of the non-magnetic powder is preferably in the range of from 0.8 to 1.5, more preferably from 0.9 to 1.2. The inorganic powder exhibits an SA (stearic acid) adsorption of preferably from 1 to 20 $\mu mol/m^2$, more preferably from 2 to 15 $\mu mol/m_2$. The non-magnetic powder to be contained in the lower coating layer preferably exhibits a wetting heat by water of from 200 $erg/cm^2$ to 600 $erg/cm^2$ at a temperature of 25° C. Alternatively, a solvent having a wetting heat defined in the above range may be used. The optimum number of water molecules on the surface of the non-magnetic powder at a temperature of from 100 to 400° C. is in the range of 1 to 10/100A. The pH value of the isoelectric point in water is preferably in the range of from 3 to 6.

The surface of the non-magnetic powder is preferably treated the change at least a part of the surface covered with at least one compound selected from the group consisting of $Al_2O_3$, $SiO_2$, $TiO_2$, $ZrO_2$, $SnO_2$, $Sb_2O_3$ and ZnO, more preferably with at least one of $Al_2O_3$, $SiO_2$, $TiO_2$ and $ZrO_2$, most preferably with at least one $Al_2O_3$, $SiO_2$ and $ZrO_2$ in the light of dispersibility. The surface treatment can be carried out by coprecipitation with a non-magnetic powder. Alternatively, the non-magnetic powder may be treated to change a part of the surface thereof to cover with alumina, followed by the treatment of another part of the surface thereof to cover with silica, and vice versa. The surface-covered layer thus formed may be porous depending on the purpose. In general, the surface-covered layer is preferably homogeneous and dense.

Specific examples of the non-magnetic powder to be contained in the lower coating layer of the present invention include Nanotite (manufactured by Showa Denko K.K.), HIT-100, ZA-G1 (manufactured by Sumitomo Chemical Co., Ltd.), α-hematite, DPN-250, DPN-250BX, DPN-245, DPN-270BX (manufactured by Toda Kogyo Corp.), TTO-51B, TTO-55A, TTO-55B, TTO-55C, TTO-55S, TTO-55D, SN-100, α-hematite E270, E271, E300 (manufactured by Ishihara Sangyo Kaisha Ltd.), STT-4D, STT-30D, STT-30, STT-65C (manufactured by Titan Kogyo K. K.), MT-100S, MT-100T, MT-150W, MT-500B, MT-600B, MT-100F, MT-500HD (manufactured by Teika Co., Ltd.), FINEX-25, BF-1, BF-10, BF-20, ST-M (manufactured by Sakai Chemical Industry Co., Ltd.), DEFIC-Y, DEFIC-R (manufactured by Dowa Mining Co., Ltd.), AS2BM, TiO2P25 (manufactured by Nihon Aerogel K. K.), 100A, 500A (manufactured by Ube Industries, Ltd.), and Y-LOP (manufactured by from Titan Kogyo K. K.) and calcined product thereof.

Particularly preferred examples of non-magnetic powder are titanium oxide and α-iron oxide. The α-iron oxide (hematite) may be produced under the following conditions. In other words, the α-$Fe_2O_3$ powder of the present invention is produced from an acicular goethite obtained by any of the following methods as a precursor. (1) A method which comprises passing an oxygen-containing gas through a suspension containing ferrous hydroxide colloid obtained by adding the equal or greater amount of an aqueous solution of alkali hydroxide to an aqueous solution of ferrous salt at pH 11 or higher at a temperature of not higher than 80° C. so that the reaction system undergoes oxidation reaction to produce an acicular goethite powder. (2) A method which comprises passing an oxygen-containing gas through a suspension containing $FeCO_3$ obtained by the reaction of an aqueous solution of ferrous salt with an aqueous solution of alkali carbonate so that the reaction system undergoes oxidation reaction to produce a spindle-shaped goethite powder. (3) A method which comprises passing an oxygen-containing gas through an aqueous solution of ferrous salt containing ferrous hydroxide colloid obtained by the addition of less than the equal amount of an aqueous solution of alkali hydroxide or alkali carbonate to an aqueous solution of ferrous salt to produce an acicular goethite powder, adding an aqueous solution of alkali hydroxide to the aqueous solution of ferrous salt containing said acicular goethite powder in an amount of not less than the equal amount of $Fe^{2+}$ in the aqueous solution of ferrous salt, and then passing an oxygen-containing gas through the reaction system for growth of the acicular goethite powder. (4) A method which comprises passing an oxygen-containing gas through an aqueous solution of ferrous salt containing ferrous hydroxide colloid obtained by the addition of less than the equal amount of an aqueous solution of alkali hydroxide or alkali carbonate to an aqueous solution of ferrous salt so that the reaction system undergoes oxidation reaction to produce an acicular goethite powder, and then being subjected the acicular goethite powder to growth in a pH region ranging from acid to neutrality.

Hetero elements such as Ni, Zn, P and Si which are commonly added for improvement of the properties of powder may be added during the reaction of production of goethite powder.

The acicular goethite powder as a precursor may be dehydrated at a temperature of from 200° C. to 500° C., and then optionally heat-treated at a temperature of from 350° C. to 800° C. so that it is annealed to obtain an acicular $\alpha$-Fe$_2$O$_3$ powder.

The acicular goethite powder to be dehydrated or annealed may have a sintering inhibitor such as P, Si, B, Zr and Sb attached to the surface thereof.

The reason why the acicular particulate goethite is annealed by heat treatment at 350 to 800° C. is that the pore produced on the surface of the acicular $\alpha$-Fe$_2$O$_3$ powder obtained by dehydration is filled with a molten metal from the uppermost surface of the grain upon annealing to provide a smooth surface.

The $\alpha$-Fe$_2$O$_3$ powder which can be used in the present invention may be obtained by a process which comprises dispersing the foregoing acicular $\alpha$-Fe$_2$O$_3$ powder obtained by dehydration or annealing in an aqueous solution to obtain a suspension, adding an Al compound to the suspension, adjusting the pH value of the suspension so that the surface of the $\alpha$-Fe$_2$O$_3$ powder is covered by the additive compound, filtering the material, rinsing the material, drying the material, grinding the material, and then optionally subjecting the material to deaeration, compaction, etc. As the Al compound to be used there may be employed an aluminum salt such as aluminum acetate, aluminum sulfate, aluminum chloride and aluminum nitrate or alkali aluminate such as sodium aluminate. The amount of the Al compound to be added is from 0.01 to 50% by weight based on the weight of $\alpha$-Fe$_2$O$_3$ powder in the term of Al. If the amount of the Al compound to be added is below 0.01% by weight, the dispersion of the Al compound is insufficient. If the amount of the Al compound to be added exceeds 50% by weight, the Al compound pieces suspended on the surface of the grain disadvantageously interact with each other. The non-magnetic powder to be incorporated in the lower layer of the present invention can be covered with the Al compound as well as Si compound and at least one compound selected from the group consisting of P, Ti, Zn, Zr, Sn and Sb compounds. The amount of such compounds to be used with the Al compound are each from 0.01 to 50% by weight based on the weight of $\alpha$-Fe$_2$O$_3$ powder. If the amount of these compounds is below 0.01% by weight, it exerts little or no effect of improving dispersibility. On the contrary, if the amount of these compounds exceeds 50% by weight, the compounds suspended in zones other than the surface of the grain disadvantageously interact with each other.

The preparation of titanium oxide will be described hereinafter. The preparation of titanium dioxide can be mainly accomplished by sulfuric acid process or chlorine process. In the sulfuric acid process, ilumenite ore is digested with sulfuric acid to extract Ti, Fe, etc. as sulfates. Iron sulfate is then removed by crystallization. The residual titanyl sulfate solution is purified by filtration, and then thermally hydrolyzed to cause hydrous titanium hydroxide to be precipitated. The hydrous titanium hydroxide thus precipitated is filtered, and then washed. Impurities are removed by washing. A grain diameter adjustor or the like is then added to the material. The material is then calcined at a temperature of 80 to 1,000° C. to produce coarse titanium dioxide. The titanium dioxide is of rutile type or anatase type depending on the kind of nucleating agent added upon hydrolyzation. The coarse titanium dioxide may be ground, classified, and then subjected to surface treatment, etc. to produce the desired non-magnetic powder. In the chlorine process, as the ore there is used natural rutile or synthetic rutile. The ore is chlorinated in a high temperature reduced condition so that Ti is converted to TiCl$_4$ and Fe is converted to FeCl$_2$. Iron oxide solidified by cooling is separated from the liquid TiCl$_4$. The resulting crude TiCl$_4$ is then purified by fractionating. To TiCl$_4$ is then added a nucleating agent. The reaction mixture is momentarily reacted with oxygen at a temperature of not lower than 1,000° C. to obtain crude titanium dioxide. The crude titanium dioxide produced by the oxidative decomposition process is then subjected to finishing in the same manner as in the sulfate process to serve as a pigment.

In the surface treatment, the foregoing crude titanium dioxide is dry-ground, wet-ground with water and a dispersant, and then subjected to centrifugal separation to remove coarse particles. The resulting fine slurry is transferred to the surface treatment tank where it is then coated with a metal hydroxide. In some detail, a predetermined amount of an aqueous solution of a salt such as Al, Si, Ti, Zr, Sb, Sn and Zn is prepared in the surface treatment tank. The aqueous salt solution is then neutralized with an acid or alkali to produce a hydrous oxide with which the surface of titanium dioxide particles is coated. The water-soluble salts by-produced are removed by decantation, filtration and washing. The slurry is adjusted for a proper pH, filtered, and then washed with pure water. The cake thus washed is then dried by a spray dryer or band dryer. The dried material is finally ground by a jet mill to provide a product. Instead of being treated in an aqueous system, the titanium dioxide powder may be subjected to surface treatment with Al or Si by passing AlCl$_3$ or SiCl$_4$ vapor through the powder, and then introducing water vapor thereinto. For the preparation of other pigments, reference can be made to G. D. Parfitt and K. S. W. Sing, "Characterization of Powder Surfaces", Academic Press, 1976.

A carbon black may be incorporated in the undercoating layer to reduce the surface electric resistance Rs and the light transmittance, which is a well-known effect, as well as provide a desired micro Vickers hardness. The micro Vickers hardness of the lower coating layer is normally from 25 to 60 kg/mm$^2$, preferably from 30 to 50 kg/mm$^2$ for well-controlled head contact. The micro vickers hardness of the specimen is determined by means of a thin film hardness tester HMA-400 (manufactured by NEC Co., Ltd.). The foot of the penetrator used is a triangular pyramid made of diamond with a sharpness of 80° and a radius of 0.1 $\mu$m. The light transmittance is normally defined such that the percent absorption of infrared rays having a wavelength of about 900 nm is not more than 3%, particularly not more than 0.8% for VHS tape. To this end, furnace black for rubber, thermal black for rubber, black for coloring, acetylene black, etc. may be used.

The carbon black exhibits a specific surface area of generally from 100 to 500 m$^2$/g, preferably from 150 to 400 m$^2$/g, and an oil absorption of from 20 to 400 ml/100 g, preferably from 30 to 200 ml/100 g as determined with DBP. The carbon black exhibits an average particle diameter of generally from 5 to 80 m$\mu$, preferably from 10 to 50 m$\mu$, particularly preferably from 10 to 40 m$\mu$. The carbon black preferably exhibits a pH value of 2 to 10, a water content of from 0.1 to 10% and a tap density of 0.1 to 1 g/ml. Specific examples of the carbon black employable in the present invention include BLACKPEARLS 2000, 1300, 1000, 900, 800, 880, 700, VULCAN XC-72 (manufactured by Cabot Corp.), #3050B, 3150B, 3250B, #3750B, #3950B, #950, #650B, #970B, #850B, MA-600, MA-230, #400, #4010 (manufactured by Mitsubishi Kasei Corp.), CONDUCTEX SC, RAVEN 8800, 8000, 7000, 5750, 5250, 3500, 2100, 2000, 1800, 1500, 1255, 1250 (manufactured by Columbia Carbon Corp.), and Ketjen Black EC (manufactured by Akzo Co., Ltd.). These carbon blacks may be surface-treated with a dispersant, grafted with a resin or partially graphtized before use. These carbon blacks may be added to the magnetic coating solution in the form of dispersion in a binder. These carbon blacks can be used in an amount of from 1% to 50% by weight based on the weight of the foregoing inorganic powder and preferably from 5% to 40% by weight based on the total weight of the non-magnetic layer. These carbon blacks may be used singly or in combination.

For the details of the carbon black employable in the present invention, reference can be made to "Handbook of Carbon Black", Carbon Black Kyokai.

Further, an organic powder may be incorporated in the lower coating layer depending on the purpose. For example, acrylstyrene resin powder, benzoguanamine resin powder, melamine resin powder, and phthalocyanine pigment may be used. Further, polyolefin resin powder, polyester resin powder, polyamide resin powder, polyimide resin powder, and polyfluoroethylene resin may be used. The preparation of these organic powders can be accomplished by the method as described in JP-A-62-18564 and JP-A-60-255827.

For the binder, lubricant, dispersant, additives and solvent to be used in conjunction with the lower coating layer and the method for dispersing these components, those used for the magnetic layer can be employed. In particular, for the amount and kind of the binder, additives and dispersant, the well-known technique for the magnetic layer can be employed.

For example, when α-iron oxide or titanium oxide is used as the non-magnetic powder used in the lower coating layer, the non-magnetic powder may be used in combination with non-magnetic powder different therefrom (hereinafter referred to as "secondary non-magnetic powder"). Preferred examples of the secondary non-magnetic powder include an inorganic powder having a Mohs' hardness of from 6 to 10, an average particle diameter of from 0.1 to 0.8 μm and a maximum particle diameter of 1 μm or less, such as α-alumina. Use of α-alumina in combination provides effects such as reduction in abrasion at the cut edge of the magnetic recording medium, for example, on the side edge face of a tape-form magnetic recording medium, and improvement in dispersibility of the non-magnetic powder at the preparation of a coating solution for the lower coating layer.

The lower coating layer preferably has a dry thickness of from 0.2 to 5 μm, more preferably from 0.5 to 3.5 μm.

The magnetic layer will be further described hereinafter.

In a preferred embodiment of the magnetic recording medium of the present invention, a single magnetic layer is provided on the lower non-magnetic layer. The ferromagnetic powder contained in the magnetic layer is a ferromagnetic metal alloy powder mainly comprising α-Fe and containing, based on Fe, from 10 to 40 atm-% of Co and from 1.5 to 10 atm-% of Y.

This ferromagnetic metal alloy powder is preferably substantially free from Ni, because a magnetic recording medium having the same performance as the ME tape can be obtained.

The ferromagnetic metal alloy powder which is used in the particularly preferred embodiment of the present invention contains, based on Fe, from 20 to 40 atm-%, most preferably from 20 to 35 atm-% of Co and from 2 to 8 atm-% of Y. Such the ferromagnetic metal alloy powder may further contain atoms other than predetermined atoms, such as Al, Si, Sc, Ca, Ti, V, Cr, Cu, Mo, Rh, Pd, Ag, Sn, Sb, Te, Ba, W, Re, Au, Bi, La, Ce, Pr, Nd, P, Mn, Zn, Sr and B. Particularly important among these elements to be incorporated other than α-Fe in the case of magnetic metal material are Al, Si, Ca, Y, Ba, La, Nd and B. Such the ferromagnetic powder may be treated with a dispersant, lubricant, surface active agent or antistatic agent as described later before dispersion. This is further described in JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-46-39639, and U.S. Pat. Nos. 3,026,215, 3,031,341, 3,100,194, 3,242,005, and 3,389,014.

Among the above mentioned ferromagnetic powders, the ferromagnetic alloy powder may contain a small amount of hydroxide or oxide. In order to prepare such a ferromagnetic alloy powder, well-known preparation methods can be used. These methods include a method which comprises the reduction with a composite organic acid salt (mainly oxalate) and a reducing gas such as hydrogen, a method which comprises the reduction of iron oxide with a reducing gas such as hydrogen to obtain Fe or Fe-Co particles, a method which comprises the pyrolysis of a metallic carbonyl compound, a method which comprises adding a reducing agent such as sodium borohydride, hypophosphite and hydrazine to an aqueous solution of a ferromagnetic metal to reduce the ferromagnetic metal, and a method which comprises the evaporation of a metal in an inert gas under reduced pressure to obtain a finely divided powder. The ferromagnetic alloy powder thus obtained may be subjected to a well-known gradual deoxidation treatment such as process which comprises dipping the ferromagnetic alloy powder in an organic solvent, and then drying the material, process which comprises dipping the ferromagnetic alloy powder in an organic solvent with an oxygen-containing gas bubbled thereinto to form an oxide film on the surface of the ferromagnetic alloy powder, and then drying the material, and process which comprises controlling the partial pressure of oxygen gas and inert gas instead of using an organic solvent to form an oxide film on the surface of the ferromagnetic alloy powder.

The ferromagnetic powder to be incorporated in the magnetic layer of the present invention exhibits a specific surface area of generally from 45 to 80 m$^2$/g, preferably from 50 to 70 m$^2$/g as determined by FET method. If the specific surface area is below 45 m$^2$/g, the resulting magnetic recording medium suffers from a high noise. On the contrary, if the specific surface area exceeds 80 m$^2$/g, the desired surface properties cannot be easily obtained. The major axis length of the ferromagnetic powder can be in a range of from 0.04 to 0.18 μm, preferably from 0.06 to 0.13 μm and most preferably from 0.06 to 0.11 μm. The crystallite size of the ferromagnetic powder to be incorporated in the magnetic layer of the present invention is in the range of generally from 100 to 350 Å, preferably from 120 to 250 Å, more preferably from 130 to 200 Å. The magnetic iron oxide powder exhibits σs of preferably from 125 to 180 emu/g, more preferably from 110 to 170 emu/g, most preferably from 125 to 160 emu/g. The ferromagnetic powder exhibits a coercive force of preferably from 1,800 Oe to 3,500 Oe, more preferably from 1,800 Oe to 3,000 Oe. The ferromagnetic powder exhibits an acicularity ratio of preferably from 3 to 10, more preferably from 5 to 12. The ferromagnetic powder preferably exhibits a water content of 0.01 to 2%. The water content of the ferromagnetic powder is preferably optimized by the kind of the binder to be used in combination.

The pH value of the ferromagnetic powder is preferably optimized by the kind of the binder to be used in combination. The pH value of the ferromagnetic powder is in the range of generally from 4 to 12, preferably from 6 to 10. The adsorption of a lubricant such as aliphatic acid by the ferromagnetic powder thus surface-treated is advantageously in the range of not more than 100 mg/$M^2$. The ferromagnetic powder may contain soluble inorganic ions such as Na, Ca, Fe, Ni and Sr ions in some cases. If the content of such the inorganic ion is not more than 200 ppm, there are little remarkable effects on the properties.

The ferromagnetic powder to be used in the present invention preferably has as small void as possible, i.e., preferably not more than 20 vol. %, more preferably not more than 5 vol. %.

The shape of the ferromagnetic particles may be selected from acicular, spindle-shaped, granular, ellipsoidal, and tabular forms, etc. so as to satisfy the above mentioned requirements for average particle diameter. In order to keep SFD (Switching Field Distribution) of the ferromagnetic powder to not more than 0.6, the distribution of Hc in the ferromagnetic powder needs to be reduced. When SFD is not more than 0.6, the resulting ferromagnetic powder exhibits good electromagnetic characteristics, a high output, a sharp inversion of magnetization and less peak shifts and thus is suitable for high density digital magnetic recording. In order to reduce the distribution of Hc in the ferromagnetic powder, the grain size distribution of goethite may be improved. Further, γ-hematite may be prevented from being sintered.

The ferromagnetic metal alloy powder particularly preferred in the present invention has a spindle shape. The spindle-shaped ferromagnetic metal alloy powder can be synthesized by reducing a spindle-shaped goethite. More specifically, an aqueous solution of a ferrous salt such as ferrous sulfate or ferrous chloride, and an aqueous alkali carbonate solution such as sodium carbonate are reacted at a pH of from 5 to 8 to obtain a suspension containing an iron-containing precipitate, and the suspension obtained is ripened in a non-oxidation atmosphere at a temperature of from 40 to 60° C. for from 2 to 7 hours. An aqueous solution of a cobalt salt such as cobalt sulfate or cobalt nitrate is added to the above-described suspension immediately before or during ripening. A part of the aqueous cobalt salt solution may be previously added to the aqueous solution of a ferrous salt. Thereafter, air is blown into the suspension to effect oxidization reaction to prepare Co-containing spindle-shaped goethite particles. The goethite particles obtained are separated by filtration, washed with water, filter-pressed and then suspended in water. If desired, at least one selected from the group consisting of a cobalt salt such as cobalt acetate, an aqueous aluminum salt solution such as aluminum sulfate, an aqueous sodium silicate solution such as water glass, an aqueous neodymium salt solution such as neodymium nitrate, an aqueous yttrium salt solution such as yttrium nitrate, and an aqueous boric acid solution is further added. At least a part of this aqueous solution may be added during the step of oxidation reaction in the above-described goethite preparation process.

If desired, the pH of the suspension is adjusted and a known organic high polymer coagulant is added. Then, the suspension is subjected to filter pressing and separation through an Oliver filter. The cake obtained is further subjected to granulating and molding, and dried.

Thereafter, the product is heat-treated in air at a temperature of from 250 to 500° C. and formed into hematite particles. The particles are reduced under heating with hydrogen gas at a temperature of from 300 to 550° C. and then subjected to oxidation treatment to cover the particle surface with oxide film. The oxidation treatment includes a method of dipping the heat-reduced metal alloy particles in the molded form in an organic solvent and blowing oxygen-containing gas such as air thereinto, and a method of exposing the heat-reduced metal alloy particles in the molded form to an atmosphere of oxygen gas and inert gas while controlling the partial pressure of oxygen gas to thereby oxidize the particles. The latter method is preferred.

As the binder resin to be used in the present invention there can be used known thermoplastic resins, thermosetting resins, reactive resins or mixture thereof. As the thermoplastic resins there can be used those having a glass transition temperature of from –100° C. to 150° C., a number-average molecular weight of from 1,000 to 200,000, preferably from 10,000 to 100,000, and a polymerization degree of from about 50 to 1,000.

Examples of such the thermoplastic resins include polymers or copolymers containing as constituent units vinyl chloride, vinyl acetate, vinyl alcohol, maleic acid, acrylic acid, acrylic acid ester, vinylidene chloride, acrylonitrile, methacrylic acid, methacrylic acid ester, styrene, butadiene, ethylene, vinyl butyral, vinyl acetal, vinyl ether, etc., polyurethane resins, and various rubber resins. Examples of the above mentioned thermosetting resins or reactive resins include phenol resin, epoxy resin, polyurethane hardening resin, urea resin, melamine resin, alkyd resin, acrylic reactive resin, formaldehyde resin, silicone resin, epoxy-polyamide resin, mixture of polyester resin and isocyanate prepolymer, mixture of polyester polyol and polyisocyanate, and mixture of polyurethane and polyisocyanate. These resins are further described in "Plastic Handbook", Asakura Shoten. Further, well-known electron radiation curing resins can be incorporated in either the lower coating layer or upper magnetic layer.

Examples of these resins and their preparation methods are further described in JP-A-62-256219. These resins can be used singly or in combination. Preferred examples of such the combination of resins include a combination of at least one selected from vinyl chloride resin, vinyl chloride-vinyl acetate resin, vinyl chloride-vinyl acetate-vinyl alcohol resin and vinyl chloride-vinyl acetate-maleic anhydride copolymer with a polyurethane resin, and a combination thereof with polyisocyanate. Examples of the structure of polyurethane resins which can be used in the present invention include known structures such as polyester polyurethane, polyether polyurethane, polyether polyester polyurethane, polycarbonate polyurethane, polyester polycarbonate polyurethane, polycaprolactone polyurethane and polyolefin polyurethane. Of all these binders, those in which at least one polar group selected from —COOM, —$SO_3M$, —$OSO_3M$, —P=O$(OM)_2$, —O—P=$(OM)_2$ (in which M represents a hydrogen atom or alkaline metal salt group), —OH, —$NR^2$, —$N^+R^3$ (in which R is a hydrocarbon group), epoxy group, —SH, —CN, sulfobetaine, phosphobetaine, and carboxybetaine has been introduced by copolymerization or addition reaction may be preferably used to obtain better dispersibility and durability. The amount of such the polar group is in the range of preferably from $10^{-1}$ to $10^{-8}$ mol/g, more preferably from $10^{-2}$ to $10^{-6}$ mol/g.

Specific examples of these binders which can be used in the present invention include VAGH, VYHH, VMCH, VAGF, VAGD, VROH, VYES, VYNC, VMCC, XYHL, XYSG, PKHH, PKHJ, PKHC and PKFE (manufactured by Union Carbide), MPR-TA, MPR-TA5, MPR-TAL, MPR-TSN, MPR-TMF, MPR-TS, MPR-TM and MPR-TAO (manufactured by Nissin chemical Industry Co., Ltd.), 1000W, DX80, DX81, DX82, DX83 and 100FD (manufactured by Electro Chemical Industrial Co., Ltd.), MR-104, MR-105, MR110, MR100, 400X-110A (manufactured by Nippon Zeon Co. Ltd.), Nippollan N2301, N2302 and N2304 (manufactured by Nippon Polyurethane, Co., Ltd.), T-5105, T-R3080 and T-5201, Burnock D-400 and D-210-80, and Crisvon 6109 and 7209 (manufactured by Dainippon Ink And Chemicals, Inc.), Vylon UR8200, UR8300, UR8600, UR5500, UR4300, RV530, RV280, FB-84 and FB-79 (manufactured by Toyobo Co., Ltd.), Dipheramine 4020, 5020, 5100, 5300, 9020, 9022 and 7020 (manufactured by Dainichi Seika K. K.), MX5004 (manufactured by Mitsubishi Chemical Corporation), Sunprene SP-150, TIM-3003 and TIM-3005 (manufactured by Sanyo Chemical Industries Co., Ltd.), and Salan F310 and F210 (manufactured by Asahi Chemical Industry Co., Ltd.). Preferred among these compounds are MR-104, MR110, MPR-TA, UR-8200, UR8300, UR-8600, UR-5500, UR-4300 and TIM-3005.

The content of the binder to be contained in the magnetic layer of the present invention is in the range of generally from 5 to 25% by weight, preferably from 8 to 22% by weight based on the weight of ferromagnetic particles. When a vinyl chloride resin is used, its content is preferably in the range of from 5 to 30% by weight. When a polyurethane resin is used, its content is preferably in the range of from 2 to 20% by weight. When a polyisocyanate is used, its content is preferably in the range of 2 to 20% by weight. These binder resins are preferably used in these amounts in combination. It is preferred that the upper layer is free of polyisocyanate while the lower layer contains a polyisocyanate.

In the present invention, when polyurethane is used, its glass transition temperature, breaking extension, breaking stress and yield point are preferably in the range of from −50° C. to 100° C., from 100 to 2,000%, from 0.05 to 10 kg/cm$^2$ and from 0.05 to 10 kg/cm$^2$, respectively.

The magnetic recording medium of the present invention consists of two layers or more. Accordingly, it goes without saying that the amount of the binder, the amount of vinyl chloride resin, polyurethane resin, polyisocyanate or other resins to be contained in the binder, the molecular weight of resins constituting the magnetic layer, the amount of polar group, or the physical properties of the above mentioned resins can be altered according to the undercoating layer to the upper magnetic layer or other magnetic layers. The well-known technique for multi-layer magnetic layer can be employed. For example, if the amount of the binder differs from the upper layer and the lower layer or the interlayer, it is useful to increase the amount of the binder to be contained in the upper magnetic layer in order to reduce the generation of scratch on the surface of the magnetic layer. In order to improve the touch of the magnetic recording medium to the head, the amount of the binder to be contained in magnetic layers other than the upper magnetic layer or interlayers may be increased to render the magnetic recording medium flexible.

Examples of polyisocyanates which can be used in the present invention include isocyanates such as tolylenediisocyanate, 4-4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate, the reaction products of these isocyanates with polyalcohols, and polyisocyanates produced by the condensation of isocyanates. Examples of the trade names of these commercially available isocyanates include Coronate L, Coronate HL, Coronate 2030, Coronate 2031, Millionate MR and Millionate MTL (manufactured by Nippon Polyurethane Co., Ltd.), Takenate D-102, Takenate D-110N, Takenate D-200 and Takenate D-202 (manufactured by Takeda Chemical Industries, Ltd.), Desmodur L, Desmodur IL, Desmodur N and Desmodur HL (manufactured by Sumitomo Bayer Co., Ltd.), and Burnock D502 (manufactured by Dainippon Ink & Chemicals, Inc.). These isocyanates may be used singly. Alternatively, by making the best use of the difference in hardening reactivity, two or more of these isocyanates can be used in combination in both the lower coating layer and upper magnetic layer.

As carbon black which can be incorporated in the present invention there can be used furnace black for rubber, thermal black for rubber, black for coloring, acetylene black, etc. Such the carbon black preferably has a specific surface area of from 5 to 500 m$^2$/g, DBP oil absorption of from 10 to 400 ml/100 g, average grain diameter of from 5 m$\mu$ to 300 m$\mu$, pH value of from 2 to 10, water content of 0.1 to 10%, and tap density of 0.1 to 1 g/ml. Specific examples of carbon black which can be used in the present invention include BLACKPEARLS 2000, 1300, 1000, 900, 800, 880, 700, VULCAN and XC-72 (produced by Cabot Co., Ltd.), #80, #60, #55, #50, and #35 (produced by Asahi Carbon Co., Ltd.), #2400B; #2300, #5, #900, #950, #970, #1000, #30, #40, and #10B (produced by Mitsubishi Chemical Kasei Corporation), CONDUCTEX SC and RAVEN 150, 50, 40 and 15 (produced by Columbia Carbon Co., Ltd.). These carbon blacks may be surface-treated with a dispersant, grafted with a resin or partially graphtized before use. These carbon blacks may be previously dispersed in a binder before being added to the nonmagnetic coating solution. These carbon blacks may be used singly or in combination. When carbon black is used, its content is preferably in the range of from 0.1 to 30% based on the weight of ferromagnetic powder. Carbon black serves to inhibit the electrification of the magnetic layer, reduce the frictional coefficient, provide light-shielding effect, enhance the film strength, etc. These functions vary with the kind of carbon black used. It goes without saying that these carbon blacks may be different in its kind, content and combination from the upper magnetic layer and the lower coating layer or non-magnetic layer depending on the previously specified properties such as grain size, oil absorption, electrical conductivity and pH. For carbon blacks which can be incorporated in the upper layer of the present invention, reference can be made to "Handbook of Carbon Black", Carbon Black Kyokai.

Specific examples of the non-magnetic powders to be used as abrasives in the present invention include α-alumina having an alpha conversion of not less than 90%, β-alumina, γ-alumina, silicon carbide, chromium oxide, cerium oxide, α-iron oxide, corundum, artificial diamond, silicon nitride, silicon carbide, titanium carbide, titanium oxide, silicon dioxide, and boron nitride. Among these, α-$Al_2O_3$, γ-$Al_2O_3$, $Cr_2O_3$, α-$Fe_2O_3$, β-SiC, diamond are preferred. In general, known materials having a Mohs' hardness of not less than 6 are used singly or in combination. A composite material made of these abrasives (abrasives surface-treated with another abrasive) may be used. These abrasives may contain compounds or elements other than main component but exert similar effects so far as the content of the main component is not less than 90%. The grain size of these abrasives is preferably in the range of from 0.01 to 2 μm. If necessary, a plurality of abrasives having different grain sizes may be used in combination or a single abrasive having a wide grain diameter distribution may be used to provide similar effects. The tap density of these abrasives is preferably in the range of from 0.3 to 2 g/ml. The water content of these abrasives is preferably in the range of from 0.1 to 5%. The pH value of these abrasives is preferably in the range of from 2 to 11. The specific surface area of these abrasives is preferably in the range of from 1 to 30 m$^2$/g. The abrasives which can be used in the present invention may be in the form of acicular, spherical and die-like shapes. The abrasives which can be used in the present invention may preferably have edges partially on the surface thereof to provide a high abrasion. Specific examples of abrasives which can be used in the present invention include AKP-20, AKP-30, AKP-50, HIT-50, HIT-60, HIT-60A, HIT-80, HIT-80G, and HIT-100 (manufactured by Sumitomo Chemical Co., Ltd.), G5, G7, and S-1 (manufactured by Nippon Chemical Industrial Co., Ltd.), and TF-100, and TF-140 (manufactured by Toda Kogyo Co., Ltd.). The abrasives which can be used in the present invention can be varied in the kind, content and combination from the lower coating layer to the upper layer depending on the purpose. These abrasives may be incorporated in the magnetic coating solution in the form of dispersion in a binder. The member of the abrasive which is present on the surface and edge of the magnetic layer in the magnetic recording medium of the present invention is preferably in the range of not less than 5 grains/100 μm$^2$.

As the additives which can be used in the present invention there can be used those having a lubricating effect, an antistatic effect, a dispersing effect, a plasticizing effect, etc. Examples of the additives include molybdenum disulfide, tungsten disulfide, graphite, boron nitride, fluorinated graphite, silicone oil, silicone having a polar group, aliphatic acid-modified silicone, fluorine-containing silicone, fluorine-containing alcohol, fluorine-containing ester, polyolefin, polyglycol, ester alkylphosphate and alkaline metal salt thereof, alkyl-sulfuric acid ester and alkaline metal salt thereof, polyphenyl ether, fluorine-containing alkyl-sulfuric acid ester and alkaline metal salt thereof, monoaliphatic ester, dialiphatic ester or trialiphatic ester of monobasic aliphatic acid having 10 to 24 carbon atoms (which may contain an unsaturated bond or may be branched) and salt thereof with metals (e.g., Li, Na, K, Cu), monovalent, divalent, trivalent, tetravalent, pentavalent and hexavalent alcohol having 12 to 22 carbon atoms (which may contain an unsaturated bond or may be branched), alkoxy alcohol having 12 to 22 carbon atoms or monobasic aliphatic acid having 10 to 24 carbon atoms (which may contain an unsaturated bond or may be branched) with one of monovalent, divalent, trivalent, tetravalent, pentavalent and hexavalent alcohols having 2 to 12 carbon atoms (which may contain an unsaturated bond or may be branched), aliphatic ester of monoalkyl ether of alkylene oxide polymer, aliphatic amide having 8 to 22 carbon atoms, aliphatic amine having 8 to 22 carbon atoms, etc. can be used.

Specific examples of such the additives include lauric acid, myristic acid, palmitic acid, stearic acid, behenic acid, butyl stearate, oleic acid, linoleic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, and lauryl alcohol. Further, nonionic surface active agents such as alkylene oxide, glycerin, glycidol and alkylphenolethylene oxide addition product; cationic surface active agents such as cyclic amine, ester amide, quaternary ammonium salt, hydantoin derivative, heterocyclic compound, phosphonium and sulfonium; anionic surface active agents containing polar groups such as carboxylic acid, sulfonic acid, phosphoric acid, sulfuric acid ester and phosphoric acid ester; amphoteric surface active agents such as amino acid, aminosulfonic acid, sulfuric or phosphoric acid ester of amino alcohol and alkylbetaine, etc. can be used. These surface active agents are further described in "Kaimen Kasseizai Binran (Handbook of Surface Active Agents)", Sangyo Tosho K. K. These lubricants, antistatic agents, etc. may not be necessarily 100% pure but may contain impurities such as isomer, unreacted material, by-product, decomposition product and oxide. The concentration of these impurities is preferably in the range of not less than 30%, more preferably not more than 10%.

These lubricants and surface active agents which can be used in the present invention may be varied in their kind and content in the interlayer and the magnetic layer as necessary. For example, aliphatic acids may be varied in its melting point in the interlayer and the magnetic layer to control the oozing thereof to the surface. Esters may be varied in its boiling point or polarity in the interlayer and the magnetic layer to control the oozing thereof to the surface. The content of surface active agents may be controlled to improve the coating stability. The content of a lubricant in the interlayer may be higher than that in the magnetic layer to improve the lubricating effect. It goes without saying that the present invention is not limited to these examples.

The additives which can be used in the present invention may be entirely or partially added to the system at any steps during the preparation of the magnetic coating solution. For example, these additives may be mixed with magnetic particles before kneading. Further, these additives may be added to the system at the step of kneading magnetic particles with a binder and a solvent. Alternatively, these additives may be added to the system during or after the dispersion step or immediately before the coating step. Depending on the purpose, additives may be partially or entirely applied by the simultaneous or successive coating method after the application of the magnetic layer. Further, a lubricant may be applied to the surface of the magnetic layer after calendering or slitting depending on the purpose.

Examples of the trade name of these lubricants which can be used in the present invention include NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, castor oil-cured fatty acid, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monoguri MB, Nonion DS-60, Anon BF, Anon LG, butyl stearate, butyl laurate, and erucic acid (manufactured by Nippon Oils And Fats Co., Ltd.), oleic acid (manufactured by Kanto Chemical Co., Ltd.), FAL-205 and FAL-123 (manufactured by Takemoto Yushi K. K.), Enujerubu LO, Enujerubu IPM and Sansosyzer E4030 (manufactured by Shin Nihon Rika Co., Ltd.), TA-3, KF-96, KF-96L, KF-96H, KF-410, KF-420, KF-965, KF-54, KF-50, KF-56, KF-907, KF-851, X-22-819, X-22-822, KF-905, KF-700, KF-393, KF-857, KF-860, KF-865, X-22-980, KF-101, KF-102, KF-103, X-22-3710, X-22-3715, KF-910, and KF-3935 (manufactured by The Shin-Etsu Chemical Co., Ltd.), Armide P, Armide C, and Armoslip CP (manufactured by Lion Armor Co., Ltd.), Duomine TDO (manufactured by Lion Fat and Oil Co., Ltd.), BA-41G (manufactured by Nisshin Oil Mills, Co., Ltd.), and Profan 2012E, New Pole PE61, Ionet MS-400, Ionet MO-200, Ionet DL-200, Ionet DS-300, Ionet DS-1000, and Ionet DO-200 (manufactured by Sanyo Chemical Co., Ltd.).

Examples of organic solvents which can be used in the present invention include ketones such as acetone, methyl ethyl ketone, methyl isobutyl ketone, diisobutyl ketone, cyclohexanone, isophorone and tetrahydrofuran; alcohols such as methanol, ethanol, propanol butanol, isobutyl alcohol, isopropyl alcohol and methyl cyclohexanol; esters such as methyl acetate, butyl acetate, isobutyl acetate, isopropyl acetate, ethyl butyrate and glycol acetate; glycol ethers such as glycol dimethyl ether, glycol monoethyl ether and dioxane; aromatic hydrocarbons such as benzene, toluene, xylene, cresol and chlorobenzene; chlorinated hydrocarbons such as methylene chloride, ethylene chloride, carbon tetrachloride, chloroform, ethylene chlorohydrin and dichlorobenzene; N,N-dimethylformamide, and hexane. These organic solvents may be used in any proportions. These organic solvents are not necessarily 100% pure and may contain impurities such as isomers, unreacted matters, by-products, decomposition products, oxides and water content besides main components. The content of these impurities is preferably in the range of not more than 30%, more preferably not more than 10%. The kind of organic solvents which can be used in the present invention may be the same in the magnetic layer and the interlayer. A solvent having a high surface tension (e.g., cyclohexanone, dioxane) may be used for the interlayer to enhance the coating stability. Specifically, it is essential that the arithmetic mean of the solvent composition for the upper magnetic layer is not smaller than that of the solvent composition for the lower coating layer. In order to enhance the dispersibility, the polarity of the organic solvent is preferably somewhat high. The solvents to be used for these layers preferably contain a solvent having a dielectric constant of from 15 to 20 in an amount of not less than 50%. The solubility parameter of these solvents is preferably in the range of from 8 to 11.

In the thickness of the magnetic recording medium of the present invention, the thickness of the non-magnetic support is preferably in the range of from 1 to 100 $\mu$m. In particular, it is effective that a non-magnetic support having a thickness of from 1 to 8 $\mu$m is used. The sum of the thickness of the upper magnetic layer and the lower coating layer is preferably in the range of from 1/100 to 2 times the thickness of the non-magnetic support. An adhesive layer may be provided between the non-magnetic support and the lower coating layer to enhance the adhesion. The thickness of the adhesive layer is in the range of generally from 0.01 to 0.2 $\mu$m, preferably from 0.01 to 0.1 $\mu$m. A back coating layer may be provided on the other side of the non-magnetic support. The thickness of the back coating layer is in the range of generally from 0.1 to 2 $\mu$m, preferably from 0.3 to 1.0 $\mu$m. As these adhesive and back coating layers there can be used well-known layers.

The non-magnetic support which can be used in the present invention has a micro Vickers hardness of not less than 75 kg/mm$^2$. As such the non-magnetic support there can be used any well-known film such as biaxially-oriented polyethylene naphthalate, polyamide, polyimide, polyamideimide, aromatic polyamide and polybenzoxidazole. In particular, a non-magnetic support comprising an alamide resin is preferred. These non-magnetic support materials may be previously subjected to corona discharge, plasma treatment, easy adhesion treatment, heat treatment, dust-removing treatment, etc. In order to accomplish the objects of the present invention, it is necessary to use a non-magnetic support having a center-line average (surface) roughness of preferably 0.1 nm to 10 nm, more preferably 0.2 nm to 6 nm, most preferably 0.5 nm to 4 nm. Such the non-magnetic support preferably not only has a small center-line average (surface) roughness but also has no big protrusions having a height of 1 $\mu$m or more. The shape of the surface roughness may be freely controlled by the size and amount of filler to be incorporated in the nonmagnetic support as necessary. Examples of the filler include oxide and carbonate of Al, Ca, Si, and Ti, regardless of whether it is crystalline or amorphous, and finely divided-powder of organic compound such as acryl and melamine. In order to meet the requirements both for surface roughness and running durability, it is preferred that the roughness of the non-magnetic support on the backcoating layer side be greater than that on the magnetic layer side. The center line average (surface) roughness of the non-magnetic support on the backcoating layer side is preferably not less than 1 nm, more preferably not less than 4 nm. In the case where the roughness on the magnetic layer side is different from that on the backcoating layer side, a support having a dual structure may be used. Alternatively, a coating layer may be provided to provide different surface roughnesses.

The non-magnetic support which can be used in the present invention preferably exhibits F-5 (i.e., the load at the 5% elongation) values of from 10 to 50 kg/mm$^2$ in the tape-running direction and from 10 to 30 kg/mm$^2$ in the tape-width direction. In general, F-5 value in the tape-running direction is higher than F-5 value in the tape-width direction. However, if the strength in the tape-width direction of the nonmagnetic support needs to be high, the present invention is not limited to this specification. The non-magnetic support exhibits a heat shrinkage in the running and width direction of preferably not more than 3%, more preferably not more than 1.5% at 100° C. for 30 minutes, and preferably not more than 1%, more preferably not more than 0.5% at 80° C. for 30 minutes. Further, the breaking strength of the non-magnetic support is preferably in the range of from 5 to 100 kg/mm$^2$ in both directions. The elastic modulus of the non-magnetic support is preferably in the range of from 100 to 2,000 kg/mm$^2$ in both directions. In the present invention, the light transmittance at a wavelength of 900 nm is preferably not more than 30%, more preferably not more than 3%.

The process for the preparation of the magnetic coating solution for the magnetic layer in the magnetic recording medium of the present invention comprises at least kneading step, dispersion step, and mixing step which is optionally provided before or after these steps. These steps each may consist of two or more stages. The raw materials to be used in the present invention, e.g., ferromagnetic particles, binder resin, carbon black, abrasive, antistatic agent, lubricant and solvent may be added to the system at the beginning or during any step. These raw materials each may be batchwise added to the system at two or more steps. For example, polyurethane may be batchwise charged in the system at the kneading step, dispersion step or a mixing step for the viscosity adjustment after dispersion. In order to accomplish the objects of the present invention, a conventionally well-known preparation technique can, of course, be used as a step. In the kneading step, an apparatus having a strong kneading power such as continuous kneader and pressure kneader can be used to enhance Br of the magnetic recording medium of the present invention. When a continuous kneader or pressure kneader is used, the ferromagnetic powders are kneaded with the whole or part (preferably 30% by weight or more of the total weight of all binder resins) of the binder in an amount of from 15 to 500 parts by weight based on 100 parts by weight of ferromagnetic powders. These kneading techniques are further described in JP-A-1-166338 and U.S. Pat. No. 5,300,244. In the preparation of the lower coating nonmagnetic layer, a dispersion medium having a high specific gravity is preferably used. Zirconia beads and metal beads are suitable.

As examples of the apparatus and methods for coating of a magnetic recording medium having a multi-layer structure according to the present invention there can be proposed the following examples:

1. Gravure coating method, roll coating method, blade coating method, extrusion coating method or the like, which is normally used in the application of a magnetic coating, is employed to provide a lower coating layer. An upper magnetic layer is then applied to the lower coating layer while the lower coating layer is in the wet state by means of a support pressure type extrusion coating apparatus as disclosed in U.S. Pat. Nos. 4,480,583, 4,681,062 and 5,302,206.

2. An upper layer and a lower layer are applied almost simultaneously by means of a coating head having two coating passage slits as disclosed in U.S. Pat. Nos. 4,854,262, 5,072,688 and 5,302,206.

3. An upper layer and a lower layer are applied almost simultaneously by means of an extrusion coating apparatus with a backup roll as disclosed in JP-A-2-174965.

In order to inhibit the agglomeration of ferro-magnetic powder that deteriorates the electromagnetic characteristics of the magnetic recording medium, a method as disclosed in JP-A-62-95174 and 1-236968 can be used to provide the coating solution inside the coating head with a shearing force. For the viscosity of the coating solution, the range disclosed in JP-A-3-8471 should be satisfied.

In order to obtain a magnetic recording medium according to the present invention, a strong orientation needs to be effected. A solenoid having 1,000 G or more and a cobalt magnet having 2,000 G or more are preferably used in combination in such an arrangement that the same pole of the two magnets are opposed to each other. Further, a proper drying process is preferably provided before the orientation step to maximize the orientability after drying. It has been known that a high density recording can be effectively accomplished by inclining the axis of easy magnetization to the vertical direction regardless of whether the grain is acicular or tabular. This method can be used as well.

Well-known methods are preferably used additionally to enhance the adhesive property. For example, an adhesive layer mainly composed of a polymer may be provided prior to the simultaneous multiple layered coating of non-magnetic layer and magnetic layer. Alternatively, the non-magnetic support may be subjected to corona discharge, irradiation with UV or irradiation with EB.

As calendering roll there can be used a roll made of a heat-resistant plastic such as epoxy, polyimide, polyamide and polyimideamide. Only metallic rolls may be used in combination. The processing temperature is preferably in the range of generally 70° C. to 120° C. more preferably 80° C. to 100° C. The linear pressure is preferably in the range of from 200 to 500 kg/cm, more preferably 300 to 400 kg/cm.

The magnetic recording medium of the present invention preferably exhibits a frictional coefficient of from 0.1 to 0.5, more preferably from 0.2 to 0.3, to SUS420J on the magnetic layer side and the other side. The magnetic layer preferably has a surface inherent resistance of from $10^4$ to $10^{12}$ $\Omega$/sq. The magnetic layer preferably exhibits an elastic modulus of from 100 to 2,000 kg/mm$^2$ at 0.5% elongation in both the tape-running direction and tape-width direction. The breaking strength of the magnetic layer is preferably in the range of from 1 to 30 kg/cm$^2$. The elastic modulus of the magnetic recording medium is preferably in the range of from 100 to 1,500 kg/mm$^2$ in both the tape-running direction and tape-width direction. The residual elongation of the magnetic recording medium is preferably in the range of not more than 0.5%. The heat shrinkage of the magnetic recording medium at all temperatures of 100° C. or less is preferably not more than 1%, more preferably not more than 0.5%, most preferably not more than 0.1%, particularly preferably 0%. The glass transition temperature (maximum point of loss modulus of dynamic viscoelasticity measured at 110 Hz) of the magnetic layer is preferably from 50° C. to 120° C. The glass transition temperature of the lower coating layer is preferably from 0° C. to 100° C. The loss elastic modulus of the magnetic layer is preferably in the range of from $1 \times 10^8$ to $8 \times 10^9$ dyne/cm$^2$. The loss tangent of the magnetic layer is preferably in the range of not more than 0.2. If the loss tangent of the magnetic layer is too great, it can easily suffer from faulty due to adhesion. The amount of the residual solvent to be contained in the magnetic layer is preferably in the range of not more than 100 mg/m$^2$, more preferably not more than 10 mg/m$^2$. The amount of the residual solvent to be contained in the upper magnetic layer is preferably less than that of the lower coating layer. The non-magnetic lower coating layer and the magnetic layer each preferably has voids of not more than 30 vol. %, more preferably not more than 20 vol. %. The voids are preferably small to provide a high output. In some cases, certain voids are preferably secured depending on the purpose. For example, in the case of magnetic recording media for data recording, repeated use of which is particularly needed, the voids are preferably great to provide excellent running durability.

In the magnetic characteristics of the magnetic recording medium of the present invention measured by means of VSM under a magnetic field of 10 KOe, Hc in the tape running direction is preferably from 2,000 to 3,000 Oe, more preferably from 2,100 to 2,500 Oe. The squareness ratio is preferably in the range of not less than 0.75, more preferably not less than 0.80, most preferably not less than 0.85 in the tape running direction. The squareness ratio in two directions perpendicular to the tape running direction is preferably in the range of not more than 80% of that in the tape running direction. SFD of the magnetic layer is preferably in the range of not more than 0.6, more preferably not more than 0.5, ideally 0. The remanent coercive force Hr in the longitudinal direction is preferably from 1,800 Oe to 3,000 Oe. Hc and Hr in the vertical direction are each preferably from 1,000 Oe to 5,000 Oe.

The center line average (surface) roughness Ra of the magnetic layer is preferably in the range of from 1 nm to 10 nm but should be properly adjusted depending on the purpose. The smaller Ra is, the better are the electromagnetic characteristics. On the contrary, the larger Ra is, the better is the running durability. The RMS surface roughness (RRMS) of the magnetic layer determined by AFM evaluation is preferably in the range of from 2 nm to 15 nm.

The magnetic recording medium of the present invention comprises a lower coating layer and an upper magnetic layer. It can easily be presumed that the physical properties of the magnetic recording medium may be altered from the lower coating layer to the magnetic layer. For example, the elastic modulus of the magnetic layer can be enhanced to improve the running durability thereof while the elastic modulus of the lower coating layer can be lower than that of the magnetic layer to improve the contact of the magnetic recording medium with the head. Further, the method for raising the tensility of the support may be used to improve the head contact in the present invention. A support the tensility of which has been raised in the direction perpendicular to the longitudinal direction of the tape can often exhibit a good head contact.

The present invention will be further described in the following examples and comparative examples, but the present invention should not be construed as being limited thereto. The term "parts" as used herein is meant to indicate "parts by weight".

EXAMPLE 1

| Lower coating layer (non-magnetic layer) | |
| --- | --- |
| Non-magnetic powder α-Fe$_2$O$_3$ hematite<br>Long axis length: 0.15 μm<br>Specific surface area determined by BET method: 52 m$^2$/g<br>pH: 6<br>Tap density: 0.8<br>DBP oil absorption: 27 to 38 ml/100 g<br>Surface-covered layer: Al$_2$O$_3$, SiO$_2$ | 80 parts |
| Carbon black<br>Average primary particle diameter: 16 μm<br>DBP oil absorption: 80 ml/100 g<br>pH: 8.0<br>Specific surface area determined by BET method: 250 m$^2$/g<br>Volatile content: 1.5% | 20 parts |
| Vinyl chloride copolymer<br>MR-110 (manufactured by Nippon Zeon Co., Ltd.) | 12 parts |
| Polyester polyurethane resin<br>Neopentyl glycol/caprolactone polyol/<br>MDI: 0.9/2.6/1 (by mol)<br>—SO$_3$Na group content: 1 × 10$^{-4}$ eq/g | 5 parts |
| α-Al$_2$O$_3$ (average particle diameter: 0.2 μm) | 1 part |
| Butyl stearate | 1 part |
| Stearic acid | 1 part |
| Methyl ethyl ketone | 100 parts |
| Cyclohexanone | 50 parts |
| Toluene | 50 parts |
| Magnetic metal layer (upper magnetic layer) | |
| Ferromagnetic metal powder<br>(composition: Fe/Co atomic ratio = 100/30)<br>Hc: 2,200 Oe<br>Specific surface area by BET method: 59 m$^2$/g<br>Crystallite size: 170Å<br>Sintering inhibitor: Al$_2$O$_3$   4 atm-%<br>                    Y$_2$O$_3$   7 atm-%<br>Grain size (long axis length): 0.08 μm<br>Acicular ratio: 5<br>σs (saturation magnetization): 141 emu/g | 100 parts |
| Polyester polyurethane resin<br>Neopentyl glycol/caprolactone<br>polyol/MDI = 0.9/2.6/1 (by mol)<br>-SO$_3$Na group content: 1 × 10$^{-4}$ eq/g | 12 parts |
| α-Al$_2$O$_3$ (average grain diameter: 0.15 μm) | 5 parts |
| Carbon black (average grain diameter: 0.08 μm) | 0.5 parts |
| Isoamyl stearate | 1 part |
| Stearic acid | 5 parts |
| Methyl ethyl ketone | 90 parts |
| Cyclohexanone | 30 parts |
| Toluene | 60 parts |

In order to prepare the foregoing various coating compounds, the foregoing components were kneaded by an open kneader, and then subjected to dispersion by a sand mill. 5 parts of a polyisocyanate ("Coronate L", manufactured by Nippon Polyurethane Co., Ltd.) were added to the coating solution of lower coating layer. 40 parts of a mixture of methyl ethyl ketone and cyclohexanone were added to the coating solution of lower coating layer and the coating solution of upper magnetic layer, respectively. The two mixtures were each filtered through a filter having an average pore diameter of 1 μm to prepare the desired coating solution of lower coating layer and coating solution of magnetic layer, respectively.

The coating solution of lower coating layer thus obtained was applied to the foregoing non-magnetic support having a thickness of 5.5 μm and a center line average (surface) roughness of 0.002 μm to obtain a dry thickness of 1.0 μm. The coating solution of magnetic layer was immediately applied to the lower coating layer to obtain a dry thickness of 0.12 μm. The coated support was then oriented by a cobalt magnet having a magnetic force of 3,000 G and a solenoid having a magnetic force of 3,000 G while the two layers were in the wet state. The coated support thus oriented was then dried. The coated support was then treated at a temperature of 90° C. by a 7-step calender singly composed of metal roll at a rate of 200 m/min. Thereafter, a back layer was applied to the coated support to obtain a thickness of 0.5 μm. The coated support was then slitted into 6.35-mm wide tape to prepare a digital video tape for DVC.

EXAMPLE 2

A digital video tape for DVC was prepared in the same manner as in Example 1 except that the composition of the magnetic metal layer was changed to the following composition:

| Finely divided ferromagnetic metal powder<br>(composition: Fe/Co atomic ratio = 100/10)<br>Hc: 2,500 Oe<br>Specific surface area determined by BET: 62 m$^2$/g<br>Crystallite size: 190Å<br>Sintering inhibitor: Al$_2$O$_3$   Table 1<br>                    Y$_2$O$_3$   Table 1<br>Grain size (long axis length): 0.11 μm<br>Acicular ratio: 10<br>σs: 160 emu/g | 100 parts |
| --- | --- |

EXAMPLE 3

A digital video tape for DVC was prepared in the same manner as in Example 1 except that the composition of the magnetic metal layer was changed to the following composition:

| Finely divided ferromagnetic metal powder<br>(composition: Fe/Co atomic ratio = 100/39)<br>Hc: 2,250 Oe<br>Specific surface area determined by BET: 49 m$^2$/g<br>Crystallite size: 180Å<br>Sintering inhibitor: Al$_2$O$_3$   Table 1<br>                    Y$_2$O$_3$   Table 1<br>Grain size (long axis length): 0.08 μm<br>Acicular ratio: 5<br>σs: 145 emu/g | 100 parts |
| --- | --- |

Comparative Example 1

A digital video tape for DVC was prepared in the same manner as in Example 1 except that the composition of the magnetic metal layer was changed to the following composition:

| | |
|---|---|
| Finely divided ferromagnetic metal powder (composition: Fe/Co atomic ratio = 100/45) | 100 parts |
| Hc: 1,850 Oe | |
| Specific surface area determined by BET: 62 m²/g | |
| Crystallite size: 165Å | |
| Sintering inhibitor: Al₂O₃ | Table 1 |
| Y₂O₃ | Table 1 |
| Grain size (long axis length): 0.08 μm | |
| Acicular ratio: 5 | |
| σs: 135 emu/g | |

Comparative Example 2

A digital video tape for DVC was prepared in the same manner as in Example 1 except that the composition of the magnetic metal layer was changed to the following composition:

| | |
|---|---|
| Finely divided ferromagnetic metal powder (composition: Fe/Co atomic ratio 100/3) | 100 parts |
| Hc: 1,880 Oe | |
| Specific surface area determined by BET: 58 m²/g | |
| Crystallite size: 170Å | |
| Sintering inhibitor: Al₂O₃ | Table 1 |
| Y₂O₃ | Table 1 |
| Grain size (long axis length): 0.08 μm | |
| Acicular ratio: 5 | |
| σs: 120 emu/g | |

Comparative Example 3

A digital video tape for DVC was prepared in the same manner as in Example 1 except that the thickness of the magnetic layer was changed from 0.12 μm to 0.04 μm.

EXAMPLE 4

A digital video tape far DVC was prepared in the same manner as in Example 1 except that the thickness of the magnetic layer was changed from 0.12 μm to 0.8 μm and the thickness of the lower non-magnetic layer and the base were changed as shown in Table 1.

Comparative Example 4

A digital video tape for DVC was prepared in the same manner as in Example 1 except that the thickness of the magnetic layer was changed from 0.12 μm to 1.0 μm and the thickness of the lower non-magnetic layer and the base were changed as shown in Table 1.

EXAMPLE 5

A digital video tape for DVC was prepared in the same manner as in Example 1 except that the composition of the magnetic metal layer was changed to the following composition:

| | |
|---|---|
| Finely divided ferromagnetic metal powder (composition: Fe/Co atomic ratio = 100/30) | 100 parts |
| Hc: 2,200 Oe | |
| Specific surface area determined by BET: 56 m²/g | |
| Crystallite size: 160Å | |
| Sintering inhibitor: Al₂O₃ | Table 1 |
| Y₂O₃ | Table 1 |
| Grain size (long axis length): 0.08 μm | |
| Acicular ratio: 6 | |
| σs: 137 emu/g | |

Comparative Example 5

A digital video tape for DVC was prepared in the same manner as in Example 1 except that the content of Y in the magnetic powder was changed from 7 atm-% to 12 atm-%. The physical properties of the magnetic material were as follows:

| | |
|---|---|
| Finely divided ferromagnetic metal powder (composition: Fe/Co atomic ratio = 100/30) | 100 parts |
| Hc: 2,250 Oe | |
| Specific surface area determined by BET: 52 m²/g | |
| Crystallite size: 160Å | |
| Sintering inhibitor: Al₂O₃ | Table 1 |
| Y₂O₃ | Table 1 |
| Grain size (long axis length): 0.08 μm | |
| Acicular ratio: 7 | |
| σs: 125 emu/g | |

EXAMPLE 6

A digital video tape for DVC was prepared in the same manner as in Example 1 except that the content of Y in the magnetic powder was changed from 7 atm-% to 2 atm-%. The physical properties of the magnetic material were as follows:

| | |
|---|---|
| Finely divided ferromagnetic metal powder (composition: Fe/Co atomic ratio = 100/30) | 100 parts |
| Hc: 2,180 Oe | |
| Specific surface area determined by BET: 58 m²/g | |
| Crystallite size: 180Å | |
| Sintering inhibitor: Al₂O₃ | Table 1 |
| Y₂O₃ | Table 1 |
| Grain size (long axis length): 0.08 μm | |
| Acicular ratio: 4 | |
| σs: 139 emu/g | |

Comparative Example 6

A digital video tape for DVC was prepared in the same manner as in Example 1 except that the content of Y in the magnetic powder was changed from 7 atm-% to 1 atm-%. The physical properties of the magnetic material were as follows:

| | |
|---|---|
| Finely divided ferromagnetic metal powder (composition: Fe/Co atomic ratio = 100/30) | 100 parts |
| Hc: 1,540 Oe | |
| Specific surface area determined by BET: 69 m²/g | |
| Crystallite size: 195Å | |
| Sintering inhibitor: Al₂O₃ | Table 1 |
| Y₂O₃ | Table 1 |
| Grain size (long axis length): 0.08 μm | |
| Acicular ratio: 4 | |
| σs: 140 emu/g | |

Comparative Example 7

A digital video tape for DVC was prepared in the same manner as in Example 1 except that the thickness of the magnetic layer was changed from 0.12 μm to 1.3 μm.

EXAMPLE 8

A digital video tape for DVC was prepared in the same manner as in Example 1 except that the composition of the magnetic metal layer was changed to the following composition:

| | | |
|---|---|---|
| Finely divided ferromagnetic metal powder (composition: Fe/Co atomic ratio = 100/30) Hc: 2,250 Oe Specific surface area determined by BET: 58 m²/g Crystallite size: 180Å | | 100 parts |
| Sintering inhibitor: | Al₂O₃ | Table 1 |
| | Y₂O₃ | Table 1 |
| Grain size (long axis length): 0.08 μm Acicular ratio: 5 σs: 135 emu/g | | |

Comparative Example 8

A digital video tape for DVC was prepared in the same manner as in Example 1 except that the composition of the magnetic metal layer was changed to the following composition:

| | | |
|---|---|---|
| Finely divided ferromagnetic metal powder (composition: Fe/Co atomic ratio = 100/30) Hc: 2,250 Oe Specific surface area determined by BET: 62 m²/g Crystallite size: 170Å | | 100 parts |
| Sintering inhibitor: | Al₂O₃ | Table 1 |
| | Y₂O₃ | Table 1 |
| Grain size (long axis length): 0.08 μm Acicular ratio: 5 σs: 115 emu/g | | |

The tapes thus prepared were each evaluated as follows:

Measurement of thickness of magnetic layer

The magnetic recording medium was cut in the longitudinal direction by a diamond cutter to a tape having a width of about 0.1 μm. The section of the specimen was then observed and photographed under a transmission electron microscope at 30,000 power. The print size of the photograph was A4 (210 mm×297 mm). Thereafter, paying attention to the difference in the shape of ferromagnetic powder and non-magnetic powder between the magnetic layer and the non-magnetic layer, the interface of the two layers was marked black on the photograph. Similarly, the surface of the magnetic layer was marked black on the photograph. The distance between the two black marking lines was then measured by an image processor IBAS2 (manufactured by Zeiss Corp.). The measurement was effected at various points along a length of 21 cm on the photograph. These measurements were then arithmetically averaged to calculate the thickness of the magnetic layer.

Specific surface area by BET method

A counter soap (manufactured by Counterchrome Inc. of U.S.A.) was used. The specimen was dehydrated at a temperature of 250° C. in an atmosphere of nitrogen for 30 minutes, and then measured for specific surface area by BET single-point method (partial pressure: 0.30).

Magnetic properties Hc, Br; squareness ratio

These properties were measured at Hm of 10 kOe by means of a vibrating sample type magnetometer (manufactured by Toei Kogyo Co., Ltd.). Bm was measured by the foregoing method for the measurement of thickness of magnetic layer.

Center line average (surface) roughness

The surface of the magnetic recording medium was measured for Ra on the area of about 250 nm×250 nm by MIRAU method using TOPO3D (manufactured by WYKO Co., Ltd.). The measurement wavelength was about 650 nm. Spherical surface correction and cylinder correction were made on the measurements. In this measurement method, a non-contact surface roughness meter utilizing interference of light is used.

Grain diameter of ferromagnetic powder and non-magnetic powder

The specimen was photographed under a transmission electron microscope. The length in the long axis and length in the short axis of the powder were directly measured on the photograph. Alternatively, the photograph was traced by an image analyzer IBASS1 (manufactured by Carlzeis Corp.) to determine the length in the long axis and length in the short axis of the powder. The two methods were properly used in combination to determine the average particle diameter.

Crystallite size of ferromagnetic powder

In the case of ferromagnetic γ-iron oxide powder, the crystallite size of the specimen was determined from the difference in the half value width of diffraction line of (4,4,0) plane and (2,2,0) plane by X-ray diffractometry. In the case of ferromagnetic metal powder, the crystallite size of the specimen was determined from the difference in the half value width of diffraction line of (1,1,0) plane and (2,2,0) plane by X-ray diffractometry.

Analysis of composition of magnetic metal material

A 4N hydrochloric acid was added to 0.1 g of a magnetic metal powder to make 25 ml. The solution was then diluted to 1N. The solution was then diluted with a 1N hydrochloric acid solution in such an amount that its concentration corresponded to that of the reference solution to prepare a specimen solution. The specimen solution was then measured by means of an ICP emission spectroscopic analyzer ("SPC1200A" manufactured by Seiko Electric Industry Co., Ltd.) to determine the content of various elements in atm-% based on Fe. As the standard solution there was used a commercially available reagent for atomic absorption spectroscopy (standard metal solution).

Electromagnetic characteristics

1/2 Tb output

The gap between channel bits is called Tb.

As a reference there was used a high performance ME ("MTR-1221", manufactured by Matsushita Electric Industrial Co., Ltd.) as defined by HD Association. Using an external application type drum tester, a 21 MHz signal was inputted on the video tape at a relative speed of 10.2 m/sec. The reproduced output was then measured. The magnetic head used was an Fe-based MIG head having Bs of 1.5 T. The recorded wavelength of 1/2 Tb signal in DVC corresponded to 0.49 μm. The 1/2 Tb output is preferably higher. A video tape which exhibits 1/2 Tb output of −1 dB higher than that MTR-1221 can be used as a video tape for DVC.

1/2 Tb CNR

A signal was recorded on the external application type drum tester in the foregoing manner. The output at 1/2 Tb, total noise at 1/2.25 Tb, total noise at 1/1.18 Tb, and amplifier noise at 1/2 Tb were measured. The definition band was 30 KHz.

Tape noises at 1/2 Tb frequency are defined as follows:

$N_{tape} = (N^{tot}{}_2 - N_{amp}{}^2)^{1/2}$ $N_{tot} = (N_{tot1} + N_{tot2})/2$ $N_{tot1}$: total noise at 1/2.25 Tb frequency $N_{tot2}$: total noise at 1/1.8 Tb frequency $N_{amp}$: amplifier noise at 1/2 Tb The relative ratio of the foregoing 1/2 Tb output to 1/2 Tb noise is represented in dB to define 1/2 Tb CNR. The difference from the subreference tape MTR-1221 in dB is called 1/2 Tb CNR. A video tape which has 1/2 Tb CNR of not less than −2 dB can be used as a tape for DVC.

Envelope flatness

A high performance ME tape was allowed to run for 1 hour. A monoscope signal was then recorded on the specimen tape. The recorded signal was then reproduced to measure the envelope. The ratio of the lowest output to the highest output was represented by "%". The ratio is preferably not less than 90%. It is used as a measure of compatibility in head contact.

Head abrasion

An experiment apparatus was prepared based on the supposition that it is used in DVC. The specimen tape was allowed to run in this experiment apparatus at a temperature of 25° C. and 50% RH for 100 hours. The difference in head height between before and after running was then measured. The head used was TSS with a gap length of 0.2 μm.

The results of evaluation are shown in Table 1.

TABLE 1

| Sample No. | Example 1 | Example 2 | Example 3 | Comparative Example 1 | Comparative Example 2 | Comparative Example 3 | Example 4 | Comparative Example 4 |
|---|---|---|---|---|---|---|---|---|
| Thickness of magnetic layer (μm) | 0.12 | 0.12 | 0.12 | 0.12 | 0.12 | 0.04 | 0.8 | 1.0 |
| Thickness of lower non-magnetic layer (μm) | 1.0 | 1.0 | 1.0 | 1.0 | 1.0 | 1.0 | 1.4 | 1.2 |
| Thickness of base (μm) | 5.5 | 5.5 | 5.5 | 5.5 | 5.5 | 5.5 | 4.5 | 4.5 |
| Magnetic powder | | | | | | | | |
| Co content: atm-% | 30 | 10 | 39 | 45 | 3 | 30 | 30 | 30 |
| Y content: atm-% | 7 | 7 | 7 | 7 | 7 | 7 | 7 | 7 |
| Al content: atm-% | 4 | 4 | 4 | 4 | 4 | 4 | 4 | 4 |
| BH properties | | | | | | | | |
| Hc | 2,250 | 2,180 | 2,250 | 2,180 | 1,800 | 2,310 | 2,250 | 2,240 |
| Bm | 4,550 | 4,250 | 4,650 | 4,550 | 3,850 | 4,550 | 4,550 | 4,500 |
| SFD | 0.42 | 0.31 | 0.51 | 0.79 | 0.41 | 0.30 | 0.49 | 0.51 |
| Output at recorded wavelength of 0.488μ | −0.0 | −0.7 | −0.5 | −4.5 | −2.5 | −3.2 | −0.9 | −1.5 |
| CNR at recorded wavelength of 0.488 μm | −0.2 | −0.9 | −1.1 | −6.1 | −4.1 | −5.5 | −1.0 | −3.2 |
| Envelope flatness (%) | 99 | 95 | 98 | 65 | 72 | 91 | 95 | 87 |
| Head abrasion (μm/100 hr) | 0.5 | 0.8 | 0.6 | 3.5 | 2.9 | 0.5 | 0.9 | 2.2 |

| Sample No. | Example 5 | Comparative Example 5 | Example 6 | Comparative Example 6 | Comparative Example 7 | Example 8 | Comparative Example 8 |
|---|---|---|---|---|---|---|---|
| Thickness of magnetic layer (μm) | 0.12 | 0.12 | 0.12 | 0.12 | 0.8 | 0.12 | 0.12 |
| Thickness of lower non-magnetic layer (μm) | 1.0 | 1.0 | 1.0 | 1.0. | 0 | 1.0 | 1.0 |
| Thickness of base (μm) | 5.5 | 5.5 | 5.5 | 5.5 | 5.5 | 5.5 | 5.5 |
| Magnetic powder | | | | | | | |
| Co content: atm-% | 30 | 30 | 30 | 30 | 30 | 30 | 30 |
| Y content: atm-% | 12 | 12 | 2 | 1 | 7 | 7 | 7 |
| Al content: atm-% | 4 | 4 | 4 | 4 | 4 | 11 | 13 |
| BH properties | | | | | | | |
| Hc | 2,400 | 2,410 | 2,120 | 2,240 | 2,220 | 2,200 | 2,250 |
| Bm | 4,600 | 3,920 | 4,200 | 4,120 | 4,500 | 4,380 | 3,880 |
| SFD | 0.42 | 0.45 | 0.61 | 0.78 | 0.52 | 0.53 | 0.49 |
| Output at recorded wavelength of 0.488μ | −0.9 | −2.1 | −1.0 | −3.6 | −1.8 | −0.9 | −3.4 |
| CNR at recorded wavelength of 0.488 μm | −1.0 | −4.5 | −2.0 | −5.1 | −4.5 | −2.0 | −6.2 |
| Envelope flatness (%) | 99 | 95 | 91 | 80 | 74 | 90 | 85 |
| Head abrasion (μm/100 hr) | 0.2 | 0.7 | 1.6 | 2.8 | 3.1 | 1.8 | 4.8 |

As in apparent from the results of Table 1, it was confirmed that the samples according to the present invention exhibit excellent reproduced output, CNR and envelope flatness and less head abrasion.

Comparative Examples 9 to 11

A magnetic recording medium was produced in the same manner as in Example 1 except that Y of the ferromagnetic metal alloy powder was changed to a rare earth element shown in Table 2. Each sample was evaluated in the same manner as in Example 1. The results obtained are shown in Table 2 together with the results of the sample in Example 1.

It is seen from the results in Table 2 that the ferromagnetic metal alloy powder using yttrium as the rare earth element exhibits excellent performance.

TABLE 2

| | | Example 1 | Comparative Example 9 | Comparative Example 10 | Comparative Example 11 |
|---|---|---|---|---|---|
| Thickness of the magnetic layer | μ | 0.12 | 0.12 | 0.12 | 0.12 |
| Thickness of the lower nonmagnetic layer | μ | 1 | 1 | 1 | 1 |
| Thickness of base | μ | 5.5 | 5.5 | 5.5 | 5.5 |
| Magnetic powder | | | | | |
| Co | atm-% | 30 | 30 | 30 | 30 |
| Al | atm-% | 4 | 4 | 4 | 4 |
| kind of rare earth | | Y | Sm | Nd | Pr |
| rare earth content | atm-% | 7 | 7 | 7 | 7 |
| BH properties | | | | | |
| Hc | | 2250 | 2240 | 2260 | 2210 |
| Bm | | 4550 | 4650 | 4200 | 4500 |
| SFD | | 0.42 | 0.55 | 0.52 | 0.55 |
| Output at the wavelength of 0.488μ | | 0 | −3.5 | −2.1 | −3.5 |
| CNR at the wavelength of 0.488μ | | −0.2 | −2.6 | −2.1 | −4.5 |
| Envelope flatness | | 99 | 66 | 70 | 78 |
| Head abrasion | μ/100 hr | 0.5 | 1.9 | 1.6 | 2.5 |

As mentioned above, the present invention provides a magnetic recording medium which exhibits a good compatibility with ME tape in head contact, causes no output drop and clogging and gives little head abrasion, as well as excellent magnetic properties.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a lower coating layer mainly comprising an inorganic powder and a binder provided on a non-magnetic support, and one or more magnetic layers comprising a ferromagnetic metal powder and a binder provided on the lower coating layer, wherein the total thickness of said one or more magnetic layers is from 0.05 μm to 0.8 μm and said ferromagnetic metal powder comprises Fe as a main component, Co in an amount of from 10 atm % to 40 atm %, Y in an amount of from 1.5 atm % to 10 atm % and Al in an amount of from 2 atm % to 12 atm %, based on Fe, and the atomic proportion of Y to Fe is greater than that of Al to Fe.

2. The magnetic recording medium as claimed in claim 1, wherein said one or more magnetic layers comprise a non-magnetic powder having a Mohs' hardness of not less than 6 in an amount of from 2 parts by weight to 15 parts by weight per 100 parts by weight of the ferromagnetic metal powder.

3. The magnetic recording medium as claimed in claim 2, wherein said non-magnetic powder having a Mohs' hardness of not less than 6 in the one or more magnetic layers is at least one selected from the group consisting of α-Al$_2$O$_3$, γ-Al$_2$O$_3$, Cr$_2$O$_3$, α-Fe$_2$O$_3$, β-SiC and diamond.

4. The magnetic recording medium as claimed in claim 1, wherein said inorganic powder in the lower coating layer is at least one selected from the group consisting of titanium oxide, α-iron oxide, barium sulfate, zinc oxide and alumina.

5. The magnetic recording medium as claimed in claim 1, wherein said lower coating layer and at least the magnetic layer adjacent thereto are formed by a wet-on-wet coating method.

6. The magnetic recording medium as claimed in claim 1, wherein said inorganic powder is non-magnetic.

7. The magnetic recording medium as claimed in claim 6, wherein said medium has single magnetic layer on said lower coating layer.

8. The magnetic recording medium as claimed in claim 6, wherein said ferromagnetic metal powder comprises Co in an amount of from 20 to 40 atm-%.

9. The magnetic recording medium as claimed in claim 6, wherein said ferromagnetic metal powder comprises Co in an amount of from 20 to 35 atm-%.

10. The magnetic recording medium as claimed in claim 6, wherein said ferromagnetic metal powder comprises Y in an amount of from 2 to 8 atm-%.

11. The magnetic recording medium as claimed in claim 6, wherein said ferromagnetic metal powder comprises Al in an amount of from 2 to 10 atm-%.

12. The magnetic recording medium as claimed in claim 6, wherein said inorganic powder comprises a granular non-magnetic metal oxide having a grain diameter of not more than 0.08 μm.

13. The magnetic recording medium as claimed in claim 6, wherein said inorganic powder comprises an acicular non-magnetic metal oxide having a major axis length of not more than 0.3 μm and an aspect ratio of from 2 to 20.

14. The magnetic recording medium as claimed in claim 6, wherein said ferromagnetic metal powder is substantially free of Ni.

15. The magnetic recording medium as claimed in claim 6, wherein said ferromagnetic metal powder has Hc from 1,800 to 3,500 Oe and σs from 125 to 180 emu/g.

16. The magnetic recording medium as claimed in claim 6, wherein said ferromagnetic metal powder has a major axis length from 0.04 to 0.13 μm, a crystallite size from 100 to 350 Å and an acicular ratio from 3 to 10.

17. The magnetic recording medium as claimed in claim 6, wherein said one or more magnetic layers comprises the binder in an amount from 8 to 24% by weight based on a weight of the ferromagnetic metal powder.

18. The magnetic recording medium as claimed in claim 6, wherein said lower coating layer further comprises a carbon black having a specific surface area from 100 to 500 m$^2$/g and an oil absorption from 20 to 400 ml/100 g as determined with DBP.

19. The magnetic recording medium as claimed in claim 18, wherein an amount of said carbon black is less than 50% by weight based on a total weight of the lower coating layer.

20. The magnetic recording medium as claimed in claim 6, wherein a micro vickers hardness of said lower coating layer ranges from 25 to 60 kg/mm$^2$.

21. The magnetic recording medium as claimed in claim 6, wherein said ferromagnetic metal powder has a specific surface area from 45 to 80 m$^2$/g.

22. The magnetic recording medium as claimed in claim 6, wherein said ferromagnetic metal powder is acicular and has an acicular ratio from 3 to 10.

23. The magnetic recording medium as claimed in claim 6, wherein the thickness of the one or more magnetic layers ranges from 0.1 to 0.5 μm.

* * * * *